US 6,654,673 B2

(12) United States Patent
Ferguson et al.

(10) Patent No.: US 6,654,673 B2
(45) Date of Patent: Nov. 25, 2003

(54) SYSTEM AND METHOD FOR REMOTELY MONITORING THE CONDITION OF MACHINE

(75) Inventors: Alan L. Ferguson, Peoria, IL (US);
Daniel C. Wood, East Peoria, IL (US);
Steven W. O'Neal, Bartonville, IL (US)

(73) Assignee: Caterpillar Inc, Peoria, IL (US)

( * ) Notice: Subject to any disclaimer, the term of this patent is extended or adjusted under 35 U.S.C. 154(b) by 12 days.

(21) Appl. No.: 10/017,936

(22) Filed: Dec. 14, 2001

(65) Prior Publication Data

US 2003/0114966 A1 Jun. 19, 2003

(51) Int. Cl.[7] .......................... G01M 17/00; G06F 19/00
(52) U.S. Cl. ........................................................ 701/33
(58) Field of Search ............................... 701/29, 33, 50; 709/203

(56) References Cited

U.S. PATENT DOCUMENTS

| 5,250,761 | A |   | 10/1993 | Koyanagi |         |
|-----------|---|---|---------|----------|---------|
| 5,442,553 | A | * | 8/1995  | Parrillo | 455/420 |
| 5,445,347 | A |   | 8/1995  | Ng       |         |
| 5,815,071 | A |   | 9/1998  | Doyle    |         |
| 5,825,286 | A |   | 10/1998 | Coulthard |        |
| 5,884,202 | A |   | 3/1999  | Arjomand |         |
| 5,922,037 | A |   | 7/1999  | Potts    |         |
| 5,931,877 | A |   | 8/1999  | Smith et al. |     |
| 5,995,898 | A |   | 11/1999 | Tuttle   |         |
| 6,025,776 | A |   | 2/2000  | Matsuura |         |
| 6,070,111 | A |   | 5/2000  | Takakura et al. |  |
| 6,094,609 | A |   | 7/2000  | Arjomand |         |
| 6,112,139 | A |   | 8/2000  | Schubert et al. |  |
| 6,127,947 | A | * | 10/2000 | Uchida et al. | 340/999 |
| 6,141,610 | A |   | 10/2000 | Rothert et al. |   |
| 6,169,943 | B1|   | 1/2001  | Simon et al. |     |
| 6,181,994 | B1| * | 1/2001  | Colson et al. | 701/33 |
| 6,226,572 | B1|   | 5/2001  | Tojima et al. |   |
| 6,243,629 | B1|   | 6/2001  | Sugimoto et al. | |
| 6,244,758 | B1|   | 6/2001  | Solymar et al. |  |
| 6,246,320 | B1|   | 6/2001  | Monroe   |         |
| 6,263,265 | B1| * | 7/2001  | Fera     | 701/19  |
| 6,321,142 | B1| * | 11/2001 | Shutty   | 701/1   |
| 6,330,499 | B1| * | 12/2001 | Chou et al. | 701/33 |
| 6,434,512 | B1| * | 8/2002  | Discenzo | 702/184 |
| 6,487,717 | B1| * | 11/2002 | Brunemann et al. | 717/173 |
| 2002/0173885 | A1| * | 11/2002 | Lowrey et al. | 701/29 |

* cited by examiner

Primary Examiner—Michael J. Zanelli
(74) Attorney, Agent, or Firm—Kelsey L Milman

(57) ABSTRACT

A system and method for monitoring various conditions of a machine which may be remotely located. The parameters available in the machine's monitoring system are synchronized in machine and remote systems. A diagnostic system comprised of a prognostics engine or an interface reviews data stored in the remote system and determines the parameters to be monitored and the allowable tolerances, which are relayed to the machine system. The monitoring system monitors the condition of the machine based upon the diagnostic system's directions, and the machine system reports when the parameters vary from the defined tolerances.

15 Claims, 2 Drawing Sheets

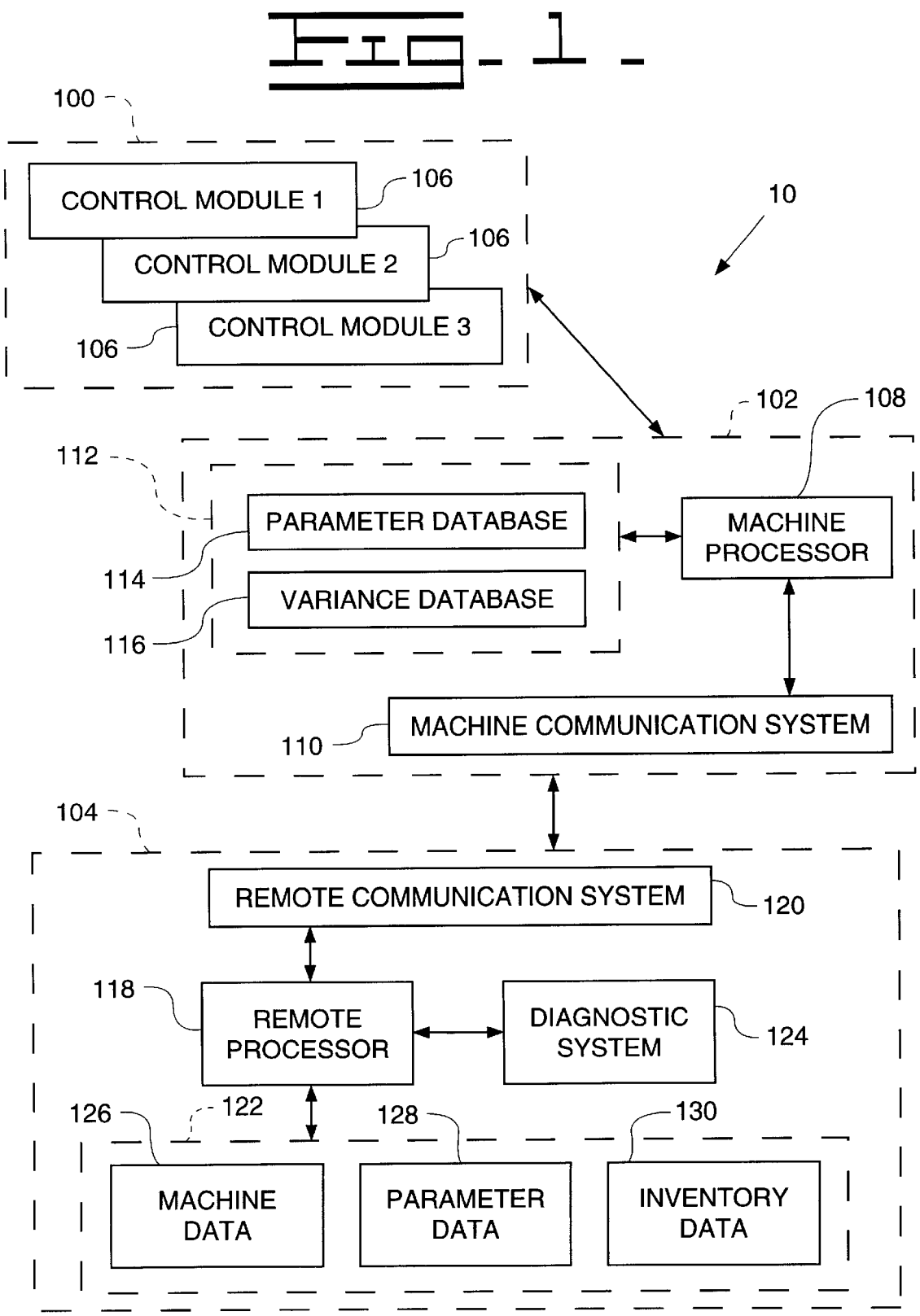

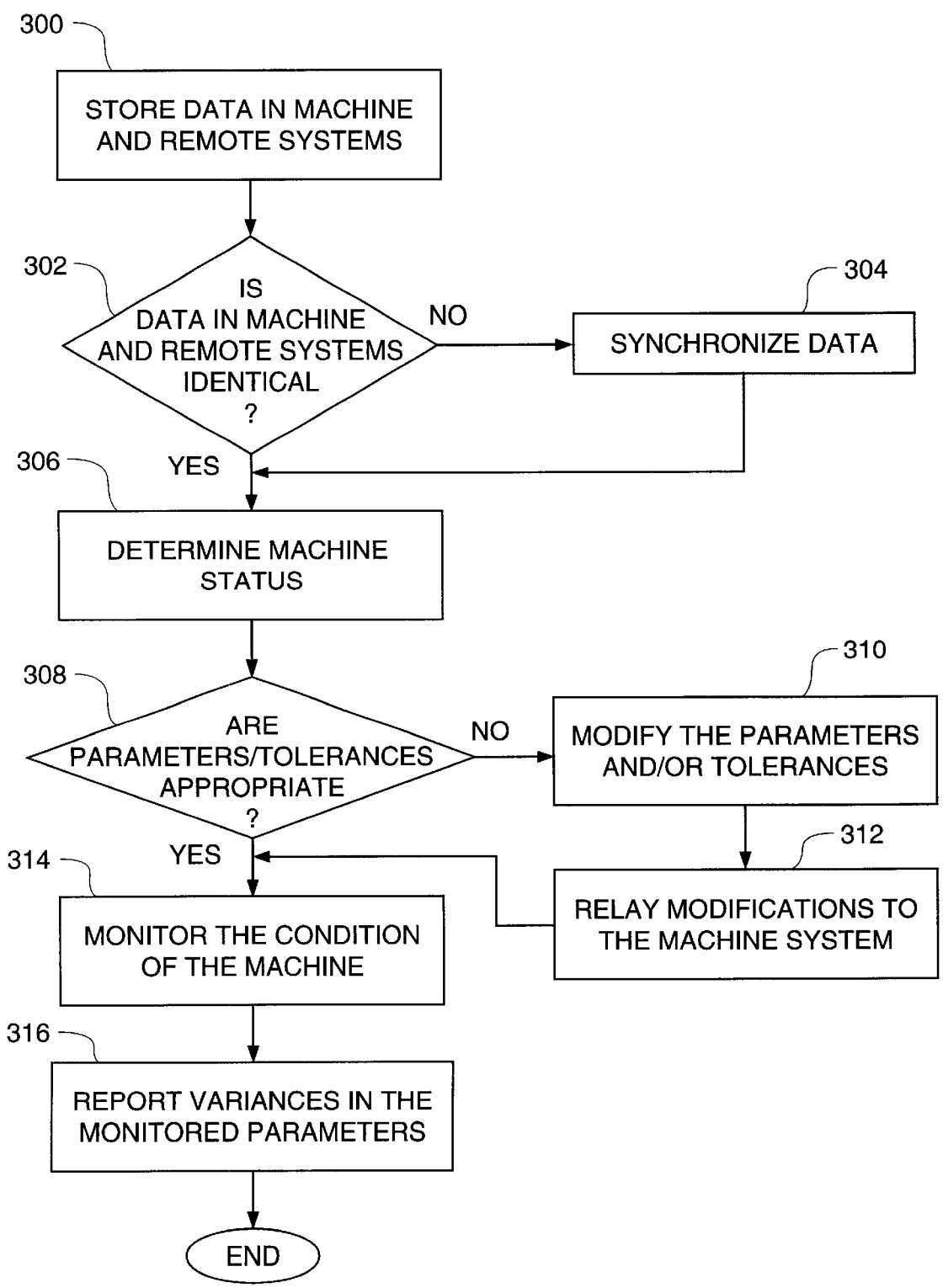

SYSTEM AND METHOD FOR REMOTELY MONITORING THE CONDITION OF MACHINE

TECHNICAL FIELD

The present invention relates generally to remotely modifying a monitoring system on a machine and, more particularly, to the selection and modification of parameters to be monitored.

BACKGROUND

Modern machines contain various electronic control and monitoring systems, which control and operate the machine and machine components and monitor the condition of the machine, its systems, and components. The control and monitoring systems are typically comprised of several electronic control modules, each of which is related to a function or component of the machine. For example, one module may control the engine, and a second module may monitor various conditions of the engine, i.e. temperature, speed, oil pressure, and the like.

Typically, if the monitored conditions fall outside of pre-defined tolerances, an error or fault code is stored along with data collected during the event. This data is then available for analysis by a service technician when diagnosing the problem or malfunction. Usually, during a service call to the machine, the technician, utilizing a portable computing device, such as, for example, a laptop or handheld personal digital assistant (PDA), directly accesses the control system of the machine via an access port on the machine. The technician is then able to download the fault data for immediate analysis on the portable computer or for transport to an office for analysis.

Oftentimes, machines are located quite remotely from an office site, thus making visits by a technician expensive and time-consuming. For example, a machine may be located at a remote mining site, requiring the technician to fly in for service calls. Further, on a large remote site, the technician may have additional difficulties in locating a particular machine once he or she reaches the site.

The control modules of the control and monitoring systems conventionally contain field reprogrammable non-volatile memory, also known as "flash" memory, which allows the software stored on the module to be modified or replaced without replacing the module. In the monitoring system of the machine, the software stored on the control modules controls which conditions, or parameters, are to be monitored and the allowable tolerances or variances for the parameters. For example, the module monitoring the engine may include software specifying that the oil pressure is to be monitored; further, the software may define the oil pressure tolerances as less than 75 psi or greater than 130 psi.

In order to modify the parameters or the acceptable tolerances, the software stored on the related control module must be modified. The software typically includes a factory programmed list of parameters and their pre-defined tolerances, which are available for monitoring on the specific component, such as, for example, the engine, and these parameters may then be enabled or disabled in the software. Typically, this is accomplished by a service technician utilizing the portable computer. The technician accesses the control system via the port on the machine and "flashes" the software update specifying which parameters to enable, i.e. monitor, and/or the acceptable tolerances for the monitored parameters. However, due to the difficulties of locating specific work machines, as discussed above, the parameters and tolerances are rarely changed on a machine.

The initial default set of parameters and tolerances is loaded into each control module during assembly of the machine. However, it would be desirable for this set to be modified based on, for example, the application of the machine or the usage hours of the machine. If a machine is operating in a harsh, desert environment, for example, the tolerances for the engine temperature may be more narrowly defined. And, during the first 1000 hours of operation of an engine, it may be desirable to more closely monitor the oil pressure. However, to modify these tolerances, the service technician would be required to visit the machine and install new software on the control module, which, as discussed, is often a difficult task.

It would be desirable to have a system to overcome the problems inherent in modifying the parameters and tolerances of a monitoring system for a machine, thus minimizing expensive service visits to a machine and allowing for more precise monitoring of the functions and components of the machine.

SUMMARY OF THE INVENTION

It is to be understood that both the foregoing general description and the following detailed description are exemplary and explanatory only and are not restrictive of the invention as claimed.

In a first embodiment, the present invention comprises a system for modifying a monitoring system of a machine, said monitoring system monitoring at least one condition of the machine. The system comprises a diagnostic system for modifying said monitored condition to a modified condition; and a communications system for relaying said modified condition to said monitoring system, wherein said monitoring system monitors the machine based on said modified condition. The diagnostic system comprises a prognostics engine having, at least one pre-defined condition based on the machine status.

In a second embodiment, the present invention comprises a method for modifying a monitoring system of a machine, said monitoring system monitoring at least one condition of the machine. The method comprises the steps of storing said monitored condition in a remote data system; modifying said monitored condition to a modified condition; and relaying said modified condition to said monitoring system wherein said monitoring system monitors the machine based on said modified condition. The monitored condition is modified to said modified condition through a diagnostic system which comprises a prognostics engine having a least one pre-defined condition based on machine status.

BRIEF DESCRIPTION OF THE DRAWINGS

The accompanying drawings illustrate exemplary embodiments of the invention and, together with the description, serve to explain the principles of the invention.

FIG. 1 is a block diagram of a system for modifying parameters and tolerances of a monitoring system on a remotely-located machine consistent with an exemplary embodiment of the present invention; and FIG. 2 is a flow chart of an exemplary embodiment of a method, consistent with the present invention, for modifying parameters and tolerances of a monitoring system on a remotely-located machine.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

In this application, in addition to any ordinary meaning, the term "operably connected" means any system or method for establishing communication and/or data transfer. Such systems or methods may include, for example, electronics, optics, radio, cellular, and/or sound techniques as well as others not expressly described herein. "Operably connected" is not intended to be limited to a hard-wired form of communication or data transfer.

In this application, in addition to any ordinary meaning, the term "owner" means any person or entity responsible for the machine and/or having the authority to monitor the condition of the machine. In some instances, for example, the term "owner" may encompass a person or entity renting a machine and desiring to monitor the machine during the rental period.

FIG. 1 illustrates a system consistent with an exemplary embodiment of the present invention, which is generally designated 10. For purposes of this disclosure, the present invention is described in connection with a remotely-located work machine, such as a track-type tractor, grader, paver, or the like. However, the present invention is equally well-suited for use with other equipment or machines having control and monitoring systems.

The system 10 preferably includes a monitoring system 100, a machine system 102, and a remote system 104. The machine system 102 is preferably mounted on the work machine. Alternatively, the machine system 102 may have a portion located on the machine and a portion located remotely from the machine. The remote system 104 is preferably located remotely from the work machine. The monitoring system 100 is preferably located on the work machine. Alternatively, the monitoring system 100 may be located, in whole or in part, remotely from the machine.

In a first embodiment, the monitoring system 100 is preferably comprised of a plurality of control modules 106, each of the modules having field programmable non-volatile memory, also known as "flash" memory. Alternatively, the monitoring system 100 may be comprised of a single control module. Within the flash memory of each control module 106 is stored software which monitors conditions or components of the work machine. In FIG. 1, the monitoring system 100 is depicted as being comprised of three control modules 106; however, the present invention is equally applicable for control systems having a greater or lesser number of control modules 106. In the alternative, the monitoring system 106 may be comprised of a plurality of discrete non-volatile memory locations on an electronic device, each of the locations capable of storing software or data.

The machine system 102 preferably includes a machine processor 108, a machine communications system 110, and a machine data system 112. The machine processor 108 controls the functions of the machine system 102 and processes data received from or sent to the remote system 104 via the machine communications system 110. The machine communications system 110 is operably connected with the machine processor 108 and communicates with the remote system 104. Preferably, the machine communication system 110 communicates by wireless communication means, such as, for example, satellite, cellular, or radio frequency technology, which are well-known by those skilled in the art. However, the machine communication system 110 may include an alternate communication means, such as a modem with access to public telephone lines.

The machine data system 112 is operably connected to the machine processor 108 and provides stored data to the machine processor 108. The machine data system preferably is comprised of a parameter database 114 capable of storing records comprised of data related to the software stored in each of the control modules 106 on the machine, the parameters associated with the software, and the allowable tolerances associated with each parameter. Alternatively, this data may be stored on each of the respective control modules. Preferably, the machine data system 112 is further comprised of a variance database 116 for storing, at least, the actual measured variances and faults. Alternatively or in addition to the variances, the variance database 116 may store all or a subset of the measured values of the parameters. The machine data system 112 may be located oh the machine, or it may be remote from the machine. In addition, the machine data system 112 may be comprised of a single database, or it may be comprised of a plurality of databases located on one or more computing devices or servers; the machine data system 112 may further comprise a processor or controller (not shown) for managing the storage of data. Alternatively, the machine data system 112 may be comprised of storage space allocated on each of the control modules 106 for storing the parameter, tolerance, and variance data; a processor or controller (not shown) may manage the storage of data on the control modules 106.

The remote system 104 is preferably comprised of a remote processor 118, a remote communications system 120, a remote data system 122, and a diagnostic system 124. The remote processor 118 controls the functions of the remote system 104 and processes data received from or sent to the machine system 102 via the remote communications system 120. The remote processor 118 may be comprised of a single control unit, or it may be comprised of a more complicated control system, such as one utilizing numerous servers, depending on the complexity of the remote system 104 needed for specific applications. Preferably, the remote communications system 120 communicates with the machine system 102 by wireless communication means, such as satellite or cellular technology, which are well-known by those skilled in the art. However, the remote communications system 120 may include an alternate communication means, such as a modem with access to public telephone lines.

The remote data system 122 preferably includes storage space for machine data 126, parameter data 128, and inventory data 130. Machine data 126 is preferably information specific to individual machines, such as total hours of operation, fuel consumed, the number of transmission shifts, etc. Preferably, the machine data 126 further includes the specific parameters currently being monitored on the machine and the associated tolerances. Parameter data 128 preferably details which parameters are available on specific control modules based on the software installed on the module; further, the parameter data 128 may include the pre-defined tolerances associated with each parameter. The parameter data 128 may be utilized across several machines, as more than one machine may have control modules with identical software installed and, therefore, have identical parameters and tolerances available for monitoring. The inventory data 130 preferably is comprised of information on the hardware and software installed on a machine and its control modules 106. The remote data system 122 may be comprised of a single database in which the machine data 126, parameter data 128, and inventory data 130 are stored. Alternatively, the remote data system 122 may be comprised of a plurality of databases stored on one or more computers or servers; in addition, the remote data system 122 may further comprise a processor or controller (not shown) to manage the storage of data within the system. The remote data system 122 is operably connected to the remote processor 118 and may be accessed by the remote processor 118.

The diagnostic system 124 is operably connected to the remote processor 118 and provides a means for modifying the conditions, such as the parameters and tolerances, to create modified conditions for use by the monitoring system 100 on the monitored machine.

In a first aspect, the diagnostic system 124 comprises an interface. The interface is operably connected to the remote processor 118 and provides a means for the owner of the machine to communicate with the remote system 104. The interface preferably includes a display (not shown) and an operator input device, such as a keyboard (not shown). However, other types of interface means, such as, for example, a hand held computing device, voice recognition means, a touch screen, or the like, may be used to interface with the remote system 104. Further, the interface may include real time or delayed communication with the remote system 104, such as an electronic mail or messaging system. And the interface may be operably connected to the remote processor 118 via a private network or via an Internet or other public network link. Preferably, if the interface is not connected via a private network, any messages relayed between the interface and the remote processor 118 will be encoded, as is well known in the art.

In a second aspect, the diagnostic system 124 comprises a prognostics engine. The prognostics engine preferably comprises a processor (not shown) for autonomously determining the parameters to be monitored and the acceptable tolerances. The prognostics engine may comprise a processor separate from the remote processor 118, or the remote processor 118 may encompass the additional functionality of the prognostics engine.

Operation of the system 10 is controlled by software that is programmed into the machine and remote processors 108 and 118 by external means. Alternatively, the program can be implemented via hardware or any other programming technique. Creation of this software based upon the description set forth in the specification is within the capabilities of one having ordinary skill in the programming arts.

As seen in FIG. 2, in control block 300, a first set of data is stored in the remote data system 122, and a second set of data, which may or may not be identical to the first set of data, is stored in the machine data system 112. Typically, these sets of data are not simultaneously stored in their respective systems 122 and 112; one set may be stored at a time substantially earlier than when the other set is stored. In addition, within each set of data, individual items or records may be stored at different times.

The data stored in the machine data storage system 112 preferably is comprised of at least a portion of the parameter database 114 and is obtained by the machine processor 108 from polling the control modules 106 of the monitoring system 100. In control block 302, the data stored in the parameter database 114 in the machine data system 112 is compared to the inventory data 130 in the remote data system 122. Preferably, if the list of control modules and associated software in the parameter database 114 of the machine data system 112 are different from the data found in the inventory data 130 of the remote data system 122, the data is synchronized, as seen in control block 304. Preferably, time or version information is associated with the data in both systems 112 and 122 to determine which data is the more recently stored and, presumably, the correct machine configuration. Typically, software or control modules 106 are updated on the machine when new versions are available, and the update is recorded in the parameter database 114 of the machine data system 112. However, if this system 112 were to malfunction or if the data in the machine data system 112 were lost, the data stored in the inventory data 130 may be the most recent. Therefore, the date stamp, version number, or other identifier is compared for the data in the two systems 112 and 122. If the data is not identical, it is synchronized, i.e. the more recent data from each system 112 or 122 is sent to the other system 112 or 122 to replace its outdated data, via the machine and remote communication systems 110 and 120.

In control block 306, the machine data 126 in the remote data system 122 is accessed to determine the machine status.

In the first aspect in which the diagnostic system 124 comprises an interface, the owner may access the machine data 126 via the interface. The interface may have a direct connection to the machine data 126 of the remote data system 122; alternatively, the machine data 126 may be displayed on a secure web site which the owner may access. The machine data 126 may be accessed in real time, such that the owner is able to review the current status of the machine. Alternatively, the machine data 126 may provide a snapshot view of the condition of the machine. Preferably, the owner may review machine data 126 such as, for example, the number of operating hours, number of transmission shifts, and the like. In the alternative, the owner need not review the current machine status; he or she may proceed based on observed or reported characteristics of the machine, rather than reviewing captured data.

In the second aspect in which the diagnostic system 124 comprises a prognostics engine, the engine may access the machine data 126 to review the status of the machine, such as, for example, the number of operating hours, number of transmission shifts, and the like. The engine will use this information to determine if the appropriate parameters and tolerances are enabled or defined for the machine.

In control block 308, it is determined if the appropriate parameters are enabled for the machine and if the associated tolerances are correctly defined.

In the first aspect in which the diagnostic system 124 is comprised of the interface, the owner preferably reviews the current parameter and tolerance settings retrieved from the machine data 126 of the remote data system 122 to determine if they are appropriate. Typically, the owner makes this determination based on the reviewed machine status data and/or reports or observations relating to the machine operation. For example, if the owner or service personnel observe that the machine is, or will be, operating outside of normal conditions, such as, for example, if the machine is being moved to a new location, or if the machine is generating frequent fault codes, the owner may desire to monitor additional or different parameters on the machine, and/or the owner may desire to modify the tolerances associated with the parameters.

In the second aspect in which the diagnostic system 124 is comprised of the prognostics engine, the engine reviews the machine status to determine if the appropriate parameters are being monitored and if the associated tolerances are appropriate for the condition of the machine. Preferably, the engine includes, or has access to, instructions based on the machine status, such as, for example, the life of the machine, to determine if the parameters and tolerances are appropriate. For example, engine oil pressure and the final drive temperature may be monitored over the life of the machine. However, the tolerances associated with those parameters may differ based on the life of the machine. For example, during the initial life of the machine or from 1–1500 hours, the engine oil pressure and the final drive temperature are often closely monitored; the oil pressure tolerance may be defined as 75–130 psi and the final drive temperature tolerance defined as >110° C. The tolerances may be adjusted to 65–130 psi and >120° C., respectively, during the majority of the life of the machine, such as, for example, from 1500–6000 hours. The tolerances may be further adjusted during the 6000–10,000 hours portion of machine life to 60–130 psi and >125° C., respectively, to aid in failure detection.

If the parameters and/or tolerances are determined not to be appropriate, then, as seen in control block 310, the parameters and/or tolerances are modified.

In the first aspect in which the diagnostics system 124 is comprised of the interface, the owner modifies the parameters via the interface. The owner may change the parameters on an interactive website by which the modifications are relayed to the remote processor 118. Alternatively, the owner may send an electronic message via the interface or directly connect to the remote data system 122 and modify the parameters and/or tolerances in the machine data 126.

In the second aspect in which the diagnostic system 124 is comprised of the prognostics engine, the engine preferably modifies the parameters and/or tolerances in the machine data 126.

As seen in control block 312, the modifications are relayed to the machine system 102. Preferably, in both the first and second aspects, any modifications which have been stored in the machine data 126 of the remote data system 122 are relayed, via the remote and machine communication networks 120 and 110, to the machine. Preferably, the machine processor 108 of the machine system 102 receives the modifications and relays them to the monitoring system 100 where the software stored on the control modules 106 is updated with the modified parameters and/or tolerances. Alternatively, the diagnostics system 124 may bypass storing the modified parameter and/or tolerance information in the machine data 126 and relay the modified parameters and/or tolerances to the remote processor 118 for relay to the machine system 102. Further, in the alternative, the machine processor 108 may store the modified parameter and/or tolerance information in the parameter database 114 of the machine data system 112.

As seen in control block 314, the condition of the machine is monitored. The monitoring system 100, preferably via the software stored on the control modules 106 and sensors (not shown) mounted on the machine, monitors the desired machine conditions such as, for example, the engine oil pressure and final drive temperature. As seen in control block 316, variances in the monitored parameters are reported. If any one of the monitored parameters falls outside of the defined tolerances, preferably a fault code and the variance information are stored in the variance database 116 for retrieval by service personnel during maintenance, or the data may be relayed to the remote system 104 or to a portable computing device (not shown) for immediate notification of the owner or other person. Alternatively, or in addition, the operator of the machine may be notified of the existence of the fault code.

Industrial Applicability

An embodiment of the present invention allows for the modification of monitored parameters and associated tolerances on a machine which may be remotely-located. It is often desirable to modify the monitored parameters based on, for example, the life or the machine, the operating conditions of the machine or the like. An embodiment of the present invention may allow the parameters and/or tolerances to be modified remotely, thus reducing the need for visits to the machine by service personnel.

In one aspect of the present invention, the owner of the machine may review the parameters which are being monitored on the machine and modify these parameters and/or their associated tolerances via an interface. In a second aspect of the present invention, the monitored parameters are modified automatically based on defined machine conditions, such as, for example, the number of operating hours. Once the parameters and/or tolerances are modified, the updated values are relayed to the machine system 102 in order to update the monitoring system 100.

It will be readily apparent to those skilled in the art that various changes and modifications of an obvious nature may be made, and all such changes and modifications are considered to fall within the scope of the appended claims. Other embodiments of the invention will be apparent to those skilled in the art from consideration of the specification and practice of the invention as disclosed herein. It is intended that the specification and examples be considered as exemplary only, with a true scope and spirit of the invention being indicated by the following claims and their equivalents.

What is claimed is:

1. A system for modifying a monitoring system of a machine, said monitoring system monitoring at least one condition of the machine, comprising:

a diagnostic system for modifying said monitored condition to a modified condition, wherein said diagnostic system comprises a prognostics engine, said prognostics engine having at least one pre-defined condition based on machine status; and a communications system for relaying said modified condition to said monitoring system, wherein said monitoring system monitors the machine based on said modified condition.

2. The system, as set forth in claim 1, wherein said prognostics engine modifies said monitored condition to said pre-defined condition when the machine has a status equal to said stored machine status.

3. The system, as set forth in claim 1, wherein said monitored condition includes at least one parameter to be monitored.

4. The system, as set forth in claim 1, wherein said monitored condition includes at least one tolerance for determining a normal operating condition of said monitored condition.

5. The system, as set forth in claim 1, further comprising:

a remote data system for receiving said monitored condition from said monitoring system, said remote data system storing said monitored condition and providing said monitored condition to said prognostics engine.

6. The system, as set forth in claim 5, wherein said diagnostic system comprises an interface accessible by an owner.

7. The system, as set forth in claim 6, wherein said interface includes an interactive website for accepting at least one modification to said monitored condition.

8. The system, as set forth in claim 7, wherein said modified condition is relayed from said website to said monitoring system through at least an Internet connection.

9. A system for modifying a monitoring system of a machine, said monitoring system monitoring at least one condition of the machine, comprising:
- a remote data system for storing said monitored condition remotely from the machine, said monitored condition including at least one of a parameter and a tolerance;
- a communication system for relaying said machine condition to said remote data system; and
- a prognostics engine, said prognostics engine having at least one pre-defined condition based on a stored machine status, said prognostics engine modifying said monitored condition to said pre-defined condition when the machine has a status equal to said stored machine status, said prognostics engine storing said modified condition in said remote data system, wherein said communication system relays said modified condition to said monitoring system.

10. The system, as set forth in claim 9, further comprising:
- an interface for allowing an owner to modify said monitored condition stored in said remote data system, said interface comprised of an interactive website and an Internet connection, said modified condition being stored in said remote data system for relay to said monitoring system of the machine.

11. A method for modifying a monitoring system of a machine, said monitoring system monitoring at least one condition of the machine, comprising the steps of:
- storing said monitored condition in a remote data system;
- modifying said monitored condition to a modified condition through a diagnostic system, wherein said diagnostic system comprises a prognostics engine, said prognostics engine having at least one pre-defined condition based on a stored machine status; and
- relaying said modified condition to said monitoring system wherein said monitoring system monitors the machine based on said modified condition.

12. The method, as set forth in claim 11, wherein said prognostics engine modifies said monitored condition to said pre-defined condition when the machine has a status equal to said stored machine status.

13. The method, as set forth in claim 11, wherein said monitored condition includes at least one parameter to be monitored.

14. The method, as set forth in claim 11, wherein said monitored condition includes at least one tolerance for determining a normal operating condition of said monitored condition.

15. The method, as set forth in claim 11, wherein said diagnostic system comprises an interface, said interface including an interactive website and an Internet connection, wherein said website accepts said modified condition.

* * * * *